(12) United States Patent
Woydt et al.

(10) Patent No.: US 6,888,274 B2
(45) Date of Patent: May 3, 2005

(54) DEVELOPMENTS TO HIGH POWER MOTORS

(75) Inventors: Mathias Woydt, Berlin (DE); Jean-Thierry Audren, Saint Remy les Chevreuse (FR); Francois Hodar, Orsay (FR)

(73) Assignee: Sagem SA, Paris (FR)

( * ) Notice: Subject to any disclaimer, the term of this patent is extended or adjusted under 35 U.S.C. 154(b) by 55 days.

(21) Appl. No.: 10/666,481

(22) Filed: Sep. 19, 2003

(65) Prior Publication Data

US 2004/0113520 A1 Jun. 17, 2004

(30) Foreign Application Priority Data

Sep. 20, 2002 (FR) .............................................. 02 11635

(51) Int. Cl.$^7$ ................................................ H02K 7/10
(52) U.S. Cl. .......................................... 310/81; 310/43
(58) Field of Search ............................... 310/81, 42–45, 310/74, 261

(56) References Cited

U.S. PATENT DOCUMENTS

| | | | | |
|---|---|---|---|---|
| 5,731,645 A | * | 3/1998 | Clifton et al. | 310/74 |
| 6,140,719 A | * | 10/2000 | Kalsi | 310/52 |
| 6,204,590 B1 | * | 3/2001 | Audren et al. | 310/316.01 |

* cited by examiner

*Primary Examiner*—Thanh Lam
(74) *Attorney, Agent, or Firm*—Blakely Sokoloff Taylor & Zafman

(57) ABSTRACT

This invention relates to a system, especially adapted for high-power motors, comprising at least one rotor (1a; 1b) and means (4a, 4b; 5a, 5b) comprising active elements (7, 8) capable of rotating the rotor(s) (1a; 1b) by their synchronized deformation; said rotating means of the rotor(s) comprising at least one petal (6) comprising a hot top (11), characterized in that the material of each hot top (11) is such that it has a thermal mass capacity ($Cp^{22C}$) of greater than 0.35 [J/g/K], and/or the material of each rotor (1a; 1b) is such that it has a thermal capacity of greater than 2 [J/cm$^3$/K].

9 Claims, 2 Drawing Sheets

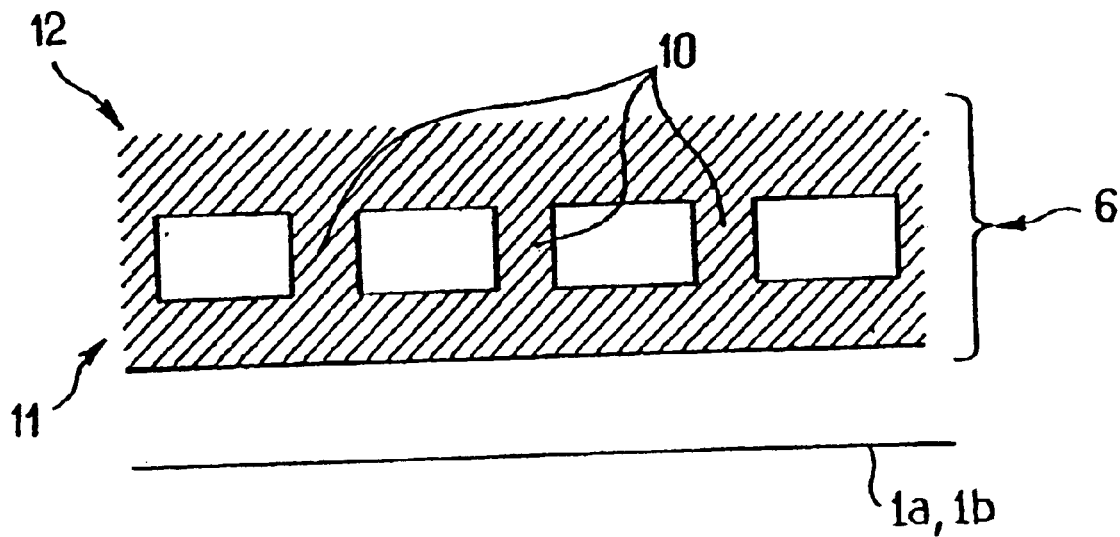
FIG_3
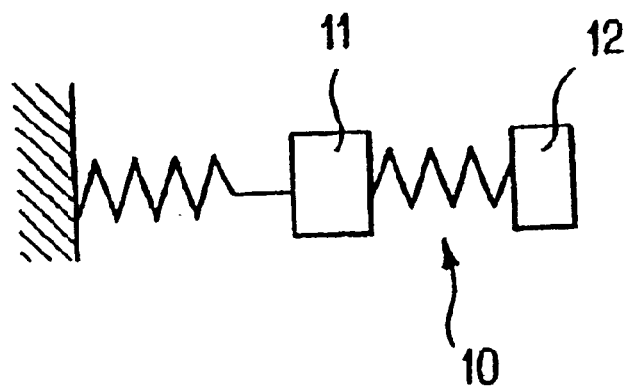
FIG_4

DEVELOPMENTS TO HIGH POWER MOTORS

GENERAL TECHNICAL FIELD

This invention relates to the application of friction materials in high power or vibration motors.

More precisely, it relates to the application of friction material in high power or vibration motors, these friction materials being at the interface between two bodies, the first body (pad) being put in contact by dry friction with the second body (rotor).

STATE OF THE ART

Certain high power motors use the elongation properties of active materials in their working.

These materials may for example be materials of the piezo-electric, magneto-strictive, electro-strictive, etc. types.

Figure 1:
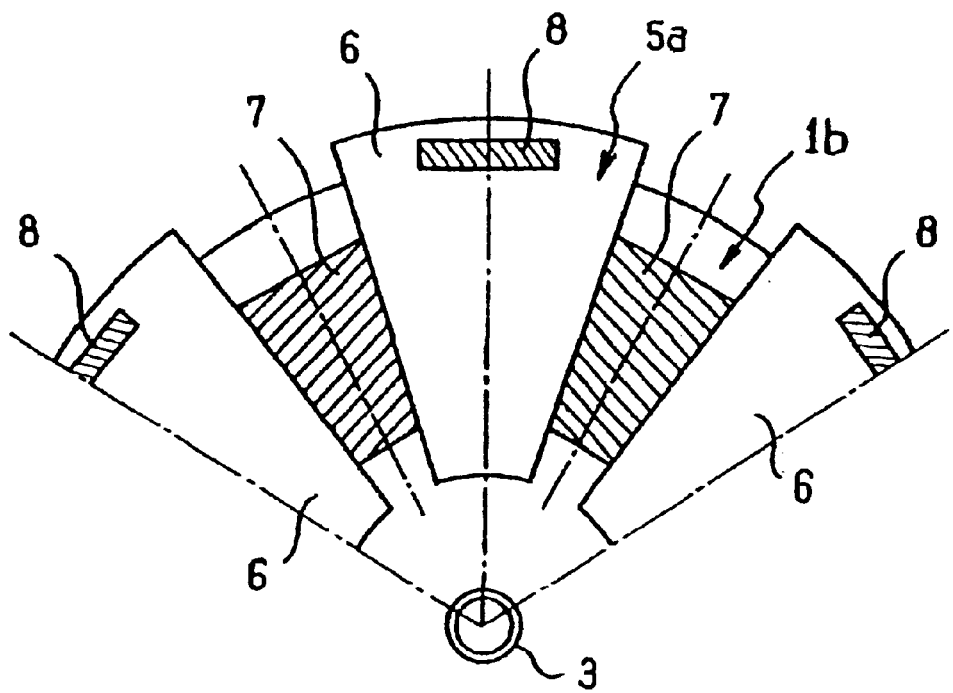
Figure 2:
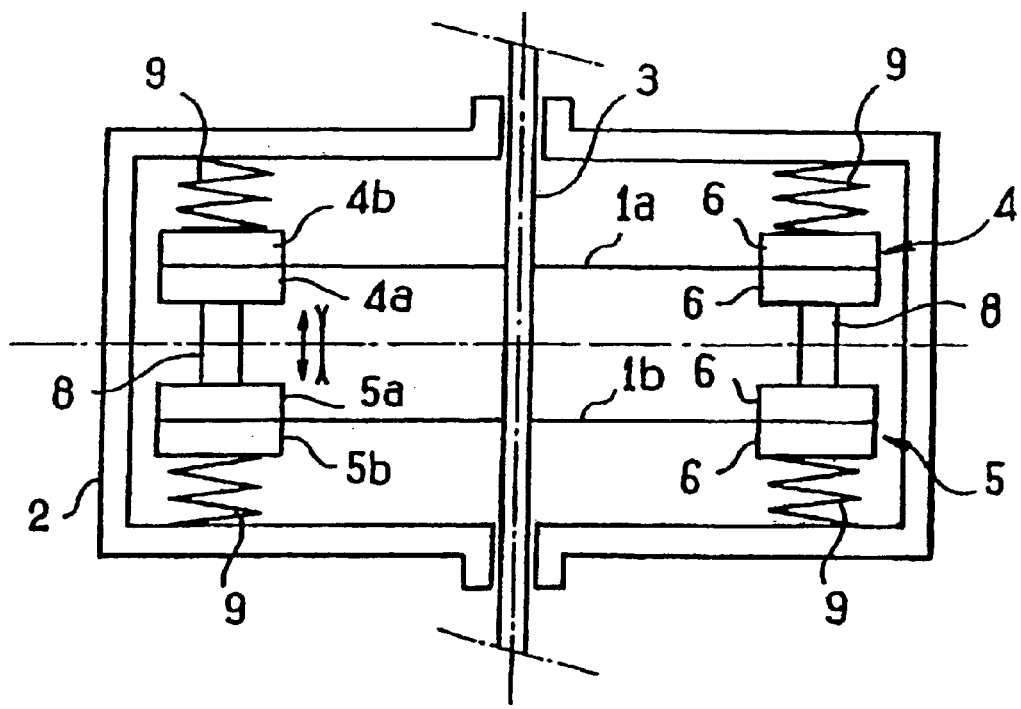

FIGS. 1 and 2 represent schematically a high power motor 2 including blocks 4a, 4b, 5a, 5b, roughly circular in shape, and two rotors 1a and 1b, the one being interposed between blocks 4a and 4b, and the other between blocks 5a and 5b.

Rotors 1a and 1b are mounted on a common shaft 3.

Blocks 4a, 4b, 5a, 5b comprise petals 6 capable of being put into contact with the rotors 1a and 1b.

Blocks 4a, 4b, 5a, 5b comprise parts made from active materials 7 interposed between the petals 6, which undergo elongations in the plane of the blocks, in order to cause the petals 6 to move.

The innermost blocks 4a and 5a are connected together, by means of petals 6, by parts 8 in active materials. These parts are capable of deforming themselves and displacing the petals 6 in the direction of the arrows seen on FIG. 2. The outermost blocks 4b and 5b are connected to the casing of the motor 2, by means of the petals 6, the parts 9 forming springs.

The synchronised elongations of parts 7 and 8 enable rotors 1a and 2b to be put into motion, particularly by the presence of friction between the petals 6 and the rotors 1a and 1b.

FIG. 3 shows schematically that the petals 6 comprise a principal part 12, connected to a contact pad 11 by intermediate parts 10 exhibiting elastic properties.

The fact that the main part is not directly in contact with the rotors 1a and 1b, and that an intermediate part 10 exhibits elastic deformation properties enables the performance of the vibration motor to be improved. In effect, the assembly 12, 10, 11 forms a double mass-spring assembly shown in FIG. 4.

If the contact pads 11 are dimensioned correctly, the performance of the vibration motor is greatly improved. In the rest of the present description, the contact pads are also called clutch shoes.

Thus, the clutch shoe, which has a limited and fixed mass for the reasons mentioned above, comprises on its surface a friction layer, in contact with a rotor. The thickness of the clutch shoe is of the order of 2 mm. As a variant, the clutch shoe may rub directly without another friction layer being present.

Generally, the intermediate layer 10 is in general of low thermal conductivity $\lambda$ ($\lambda < 0.5$ w/mK).

Vibration motors represent are an attractive option for intermittent actuators, like for example landing gear, cargo door, rudders and flaps. They are then used to replace hydraulic or pneumatic circuits, which require liquids having melting points below $-60°$ C.

These liquids exhibit flammability risks, and should be drained and dumped regularly.

These vibration motors are also used to replace electric motors comprising geared speed reducers.

Systems comprising intermittent actuators require large torque at low speed.

In the scientific and technical literature a multitude of possible combinations are to be found for possible friction drives in systems comprising pads, rotors, drums, clutch pressure plates and clutch linings. These drives enable big torque to be obtained at reduced speed.

However, said drives general possess between 10 and 30 components and all the following drawbacks:
- they lose coefficient of friction as temperature increases,
- they lose coefficient of friction as speed increases,
- they lose resistance to wear as temperature increases,
- they lose resistance to wear as speed increases.

They may also include the following other drawbacks:
- they have a maximum load for gentle wear limited to 2–3 Mpa,
- they have tribological properties which are sensitive to humidity,
- they have a friction coefficient (COF) or wear coefficient which varies differently and in an unpredictable way with speed, temperature and geometric pressure, and
- they have a wear coefficient ($K_v$) above $10^{-5}$ mm$^3$/Nm.

The main consequences of a lining composed of 10 to 30 substances and/or phases are as follows:

It has a durability which fluctuates from batch to batch and it has tribological properties which fluctuate from batch to batch.

This is mainly due to the fact that the composition and the crystal structure of certain substances are difficult to define in production.

Consequently, fluctuations in tribological properties oblige the constructor to take drastic measures to guarantee working across the range of loadings on parts using the friction materials described by the state of the art.

It should be remembered that the wear coefficient is used internationally in Tribology to describe resistance to wear. It is defined by the volume of wear divided by the normal load and the sliding distance associated with the volume of wear.

Application FR 2 819 650 proposes friction drives in linear actuators whose structure and application are very different from those of high power motors. The friction drives in application FR 2 819 650 have properties which are stable in relation to working conditions. Said friction drives are loaded without slip. Actually, they are used in clamping systems whose aim is to avoid micro-contact slipping. They do not possess significant heat dissipation properties, since they are do not have to dissipate significant quantities of heat induced by slipping phases.

Furthermore, the accumulated working life of a civil aircraft is of the order of 48,000 flying hours. For friction materials on the clutch shoe and the rotor of a high power motor, that represents loadings with an accumulated life of 2,000 hours. Hence rates of wear $k_v$ under $3 \times 10^{-8}$ mm$^3$/Nm are necessary. These rates of wear should be independent of temperature and conditions of use, as well as independent of speed of sliding.

In the same way, for industrial vehicle applications, even if the hours of use are limited to 20,000 hours, the accumulated life is also around 2,000 hours.

As might be expected, the specifications sheet for a high power motor thus requires low rates of wear and high friction coefficients. Furthermore, the friction materials have to exhibit significant thermal properties, particularly thermal diffusivity κ [in mm²/s], for the materials, particularly the rotor.

In fact, the Curie temperature limits the active effect, particularly the piezo-electric effect. Thus, if the temperature rises too far in the high power motor, its performance is altered.

The constraint of not reaching the Curie temperature limits the temperature to which the clutch shoe can be heated to around 150° C. and that of the rotor to around 200° C. The higher temperature which the rotor can tolerate is due to the fact that it is not connected to parts which are sensitive to temperature, notably piezo-electric materials, and that it is connected to an axle which constitutes a means of dissipater heat more rapidly.

State of the art drives do not allow such thermal constraints to be resolved, particularly thermal diffusivity constraints.

DISCLOSURE OF THE INVENTION

The invention proposes to compensate for these drawbacks.

In particular, the invention proposes drives made from materials and frictional layers which meet comply with several constraints at the same time. Frictional layer materials have to exhibit:

good frictional properties and low rates of wear;

good thermal properties a good distribution of heat flow;

good mechanical properties, in particular, good fatigue resistance; and good resistance to corrosion.

To this effect, the invention proposes a system, particularly suited to high power motors, comprising at least active elements suitable for setting the rotor(s) spinning through their synchronous deformation, said means of setting said rotor(s) spinning comprising at least one petal comprising a clutch shoe, characterized in that the material of each clutch shoe is such that it exhibits a specific heat capacity ($C_p^{22C}$) above 0.35 [J/g/K], and/or the material of each rotor is such that it exhibits a volume heat capacity above 2 [J/cm³/K].

The invention is advantageously supplemented by the following characteristics, taken alone or in any technically possible combination:

each clutch shoe exhibits a specific heat capacity above 0.5 [J/g/K];

the volume heat capacity of each rotor is above 2.5 [J/cm³/K];

the material of each clutch shoe and each rotor, this material not being clad, comprises:

(Ti,Mo) (C,N)+8–20% Ni/Mo binder (TM differences 8, 10, 20); and/or

WC-6Ni; and/or

Alumina toughened with zirconia (ZTA, ZTPA); and/or

AlN; and/or

Silicon carbide percolated with SiSiC, with 8–20% w/w silicon.

The material of each clutch shoe comprises:

MgO—$ZrO_2$; and/or

Aluminium nitride from hot sintered HIP-AlN; and/or

Aluminium nitride from pressure sintered GPS-AlN; and/or

Alumina toughened by zirconia (ZTA, ZTPA); and/or

A Magnéli phase ($Ti_nO_{2n-1}$, $4 \leq n \leq 10$ with n an integer, or mixtures of the type 40% $Ti_4O_7$/60% $Ti_5O_9$);

The material of each clutch shoe and each rotor is clad by thermal spatter by a material which comprises:

A Magnéli phase ($Ti_nO_{2n-1}$, $4 \leq n \leq 10$ with n an integer, or mixtures of the type 40% $Ti_4O_7$/60% $Ti_5O_9$); and/or WC-17% Co; and/or (Ti,Mo)(C,N) or (Ti,W)(C,N)+Ni/Mo binder and/or >75$Cr_3C_2$/<25NiCr; and/or 4-6$Al_2O_3$/6-4$TiO_2$; and/or the material of each clutch shoe and of each rotor comprises:

globular grey cast iron and/or lamellar grey cast iron and/or with bainitic hardening and or alloyed with Cr, Mo, Al, V, Ti; and/or Steels (Z6CND16-05-01); and or X5CrNiCu15-5 steels; and/or AlSi+SiC/$Al_2O_3$ alloys; and/or AlSi+$Al_4C_3$/$Al_2O_3$/$TiB_2$ dispersoid alloys; and/or Al—Fe—V alloys; and/or Aluminiums (series 6xxx in T6 and above and series 7xxx); and/or Silicon carbide percolated with SiSiC; and/or UNS R5xxxx titanium alloys, such as TiAl6V4.

Hard layers applied by thermal spatter should be machined to final roughnesses of $R_a$ (arithmetic roughness) less than 0.04 μm, the thickness of the machined layers being above 50 μm; and Roughness values $R_{pK}$ and $R_v$ from DIN EN ISO standard 13565-2:1998 are less than 0.030 μm and 0.070 μm respectively.

PRESENTATION OF DIAGRAMS

Other characteristics, objects and advantages of the invention emerge from the description with follows which is purely illustrative and not restrictive and should be read along with the appended diagrams, of which FIG. 1, already mentioned, represents schematically an elevation view of a high power motor;

FIG. 2, already mentioned, represents schematically a profile view of a high power motor;

FIG. 3, already mentioned, represents schematically a cross-section of a petal of a vibration motor; and FIG. 4, already mentioned, represents schematically the masses and springs system comprising the petal in FIG. 3.

DETAILED DESCRIPTION OF THE INVENTION

Creation and Absorption of Heat

The creation of heat is very important in a high power motor, because of the dry friction between the component parts. For example, a high power motor of 5 kW mechanical power produces a frictional loss of around 4.5 kW. Since the motor is not lubricated, all the frictional losses are converted into heat. The heat produced has to be stored up by the materials in contact.

Furthermore, motors in general have a limitation on their power to mass ratio. This ratio is generally equal to 1 kW per kg. Thus the motor does not have much mass for absorbing the frictional heat produced.

Distribution of Heat

The invention aims to improve the distribution of heat between the various parts of the high power motor.

It should be remembered that the thermal diffusivity κ [in mm²/s] is the deciding quantity in this distribution.

The heat generated during the actuation of the motor spreads over the surfaces of the "clutch-shoe/rotor" tribo-element.

It should be remembered that the volume of the rotor is fixed by the design. On the other hand, only the mass of the clutch shoe is fixed by the design, for example at 10 grammes each for a motor output power of 5 kW.

Thus, 220,000 joules of heat are for example generated with a frictional loss of 4.5 kW during an actuation time of less than 50 seconds. An identical heat value may also be obtained for a sequence of several actuations of a few seconds each.

The heat distribution between the various surfaces of the tribo-element depends first on the ration of the two surfaces in contact.

The ratio of the rubbing surfaces between for example a structure comprising 32 clutch shoes (17,176 mm$^2$) and for example the two sides of two rotors (50,990 mm$^2$) of a high power motor is around 1:2.98.

To calculate the distribution of the heat flow generated by friction in the tribo-contact of two sliding surfaces, the following formula (1) may be used, because the two surfaces do not differ too much one from another:

$$\frac{Q_{1clutch\text{-}shoe}}{Q_{2rotors}} = \frac{\sqrt{(\rho_1\, \lambda_1\, C_{p1})}}{\sqrt{(\rho_2\, \lambda_2\, C_{p2})}} \quad (1)$$

where $\rho$ represents the density of the material under consideration, $\lambda$ the thermal conductivity and $C_p$ the specific heat capacity.

This formula (1) is valid for two tribo-elements having roughly the same surface in contact and having heat flows q such that $$q_{rotor} + q_{clutch\text{-}shoe} = 1$$

Formula (1) shows that the distribution of heat depends firstly on the thermal properties of materials, such as conductivity, specific heat capacity and density of the materials which are rubbing together. It should also be remembered that these properties are temperature-dependent.

Dissipation of Heat

After the frictional losses have been distributed between the parts of the high-power motor, their dissipation becomes significant.

For example, in order to dissipate 220,000 joules between the rotors and the clutch shoes, stainless steels may be chosen for the clutch-shoe assembly such as X5CrNiCu15-5;

X5CrNiCuNb 17-4-4; DIN EN 1.4521/1.4548; or DIN EN 1.4542

X5CrNiCuNb 16-4,

Z7 CNU 15-05 or Z7 CNU 17-04,

Which give a heat capacity of 20,640 joules for the steel clutch-shoe assembly.

It should be remembered that a large quantity of heat is created at the interface between the clutch shoe and the disc.

Each clutch shoe is near to active materials, and/or a glue for example, which are sensitive to heat. For example, the glue should be of the polyimide type, with a vitreous transition temperature of the order of 150° C. Thus, for the clutch shoe, a material is desirable which has at the same time a low thermal conductivity and a high specific heat.

The low thermal conductivity means that the clutch shoe attracts a minimum of the heat produced at the interface.

The high specific heat means that a maximum amount of the heat which would otherwise have been transmitted to the clutch shoe will be stored.

On the other hand, the disc is not connected to heat-sensitive parts. Consequently, a desirable material for the disc will possess both high thermal conductivity and high specific heat.

The high thermal conductivity means that the disc attracts a maximum amount of the heat produced at the interface.

The high specific heat means that a maximum amount of the heat transmitted to the disc will be stored.

If the clutch shoe materials possess the properties mentioned above, then it is possible to limit their temperature to what has been fixed, namely 150° C.

In the example which is being considered, the heat to be distributed and dissipated is equal to 220 kJ. Table 1 on the following page shows the heat capacities of the materials.

In order that the temperature of the clutch shoes remains below 150° C., the ratio of the total heat to the heat stored by the 32 clutch shoes must be above 1:10. This is the case for Z6CND16-05-01 steel.

It should be noted that the ratio for silicon carbide percolated with SiSiC silicon or silicon percolated with silicon carbide according to the anglo-american terminology used by those skilled in the art, is of the order of 1:4. However, the conductivity of this material is too high for it to be used for clutch shoes.

It is for preference used for the rotor, with a tribo-active cladding.

Table 1 summarizes all the materials which are possible for clutch shoes, together with their thermal properties.

TABLE 1

| Clutch shoe material | Heat accumulated for 10 grammes and $\Delta T = 150$ k [J] | Heat accumulated for assembly of 32 clutch shoes [J] |
| --- | --- | --- |
| WC-6Ni | 375 | 12,000 |
| Z6CND16-05-01 | 645 | 20,640 |
| (Ti, Mo) (C, N) (TM10) | 750 | 24,000 |
| Globular grey cast iron | 930 | 29,760 |
| MgO—ZrO$_2$ | 1,020 | 32,640 |
| Ti$_n$O$_{2n-1}$ with integer n | 1,200 | 38,400 |
| Si$_3$N$_4$ | 1,200 | 38,400 |
| Aluminium | 1,320 | 42,240 |
| Zirconia toughened alumina (ZTA) | 1,330 | 42,560 |
| AlSi + SiC/Al$_2$O$_3$ | 1,350 | 43,200 |
| SiSiC | 1,650 | 52,800 |

The presence of alumina toughened with zirconia or alumina zirconia or ZTA according to the anglo-american terminology used by those skilled in the art should be noted.

The material for the rotor may then be chosen. However, this material should be chosen to have heat capacities which complement those of the clutch shoes.

The accumulated heat, between 20,640 and 52,800 joules (as is seen in Table 1) of the clutch shoe assembly should not be exceeded through the rotor not having sufficient heat capacity. The heat dissipated in the clutch shoe assembly should not exceed their heat capacity, in such a way that equation (2) is fulfilled.

$$Q_{clutch\text{-}shoes} \geq Q_{frictional} \left( \frac{q_{clutch\text{-}shoes}}{q_{discs} + q_{clutch\text{-}shoes}} \right) \quad (2)$$

where $Q_{frictional}$ is the heat generated by rubbing and $Q_{clutch\text{-}shoes}$ is the heat capacity of the clutch shoe assembly. Table 2 below gives examples of possible materials for the rotor(s), and gives their physical and chemical properties.

TABLE 2

| Materials | Density [g/cm³] | Thermal conductivity [W/mK] | Heat capacity [kJ/kg] (kJ/dm³) | 2-rotor heat capacity [kJ] | Maximum operation [° C.] | Mass heat capacity [J/g/K] |
|---|---|---|---|---|---|---|
| $C_{fibre}$-$C_{matrix}$ | 1.8 | 8–20 | 124 (220) | 56.2 | 1400 | 0.62 (1.8 at 1400° C.) |
| TlA16V4 | 4.6 | 6.7 | 105 (483) | 120.1 | 1000 | 0.523 |
| Aluminium 6xxx | 2.7 | 189 | 178 (480) | 121.0 | 300 | 0.89 |
| AlN | 3.3 | >170 | 160 (521) | 133.0 | 1450 | 0.8 |
| AlSI + SiC/$Al_2O_3$ | 2.9 | 120–140 ($Al_2O_3$) –180 (SiC) | 180 (520) | 131.3 | 400 | 0.9 |
| $Si_3N_4$ | 3.2 | → >100 | 160 (528) | 128.9 | 1300 | 0.8 |
| ($Ti_1MO$) ($C_1N$) | 6.5 | 60 | 92 (560) | 150.1 | >1000 | 0.46 (0.56 at 200° C.) |
| Z6CND16-05-01 | 7.7 | 15 | 86 (650) | 166.3 | 600 | 0.43 |
| SiSIC | 3.1 | >120 | 220 (680) | 171.4 | 1400 | 1.1 (1.4 at 1000° C.) |
| WC-6Ni | 14.9 | 80 | 50 (745) | 187.4 | 1000 | 0.25 (0.35 at 200° C.) |
| Grey cast iron | 7.2 | 50 (LGCI) 38 (SGCI) | 100 (810) 124 (970) | 188.6 (223.9) | 700 | 0.52 (LGCI) 0.62 (SGCI) |
| MgO-$ZrO_2$ | 5.7 | 2 | 136 (775) | 196.4 | 1000 | 0.6–0.7 |
| $Ti_nO2_{n-1}$ | 5.2 | –5 | 160 (920) | 221.1 | 700 (1400) | 0.8 |

All the materials and heat capacity values given in Table 2 are for 179 mm×5 mm diameter rotors and for ΔT=200 K.

It should be noted that the abbreviation LGCI refers to lamellar grey cast iron, while the abbreviation SGCI refers to spheroidal grey cast iron.

For the rotor, the situation is the opposite to that of the feeder. Each feeder has a defined weight (10 grams with ±10% for example). On the other hand, only the rotor volume is defined by design.

It has dimensions such that its diameter is for example 179 mm and its thickness is 5 mm. Therefore, it has a volume of approximately 125.8 cm3. However, its thickness may vary between approximately 4 and 7 mm.

Knowing the temperature variations ΔT makes it possible to obtain the absolute value of the quantity of heat absorbed [kJ/dm3] by a material.

Table 2 gives a range of 220 to 970 kJ/dm3.

This quantity or heat accumulation capacity must be considered as a volumetric value, since the space available for a rotor is independent of the material and the densities vary very significantly between materials.

"Stick" or "slip" microcontact

The tribosystem contact of the high-power motor makes an elliptical rotary movement, with a change in pressure and sliding speed.

The movement is broken down into two phases.

A "forward" phase, with slipping and pseudo-sticking. During this phase, the pressure reaches its maximum (12 MPa for a COF of 0.2) at a relatively low speed (0.5 m/s maximum, and then tending towards 0). This phase is equivalent to a transmission of power or torque.

Another "return" phase where the sliding speed reaches its maximum (approximately 2.5 m/s) in the opposite direction to that above or against the direction of rotor rotation. During this phase, the pressure drops to around 2 MPa. The total cycle time is 50 μs.

TABLE 3

| | Forward | | | Return | | |
|---|---|---|---|---|---|---|
| Quantity | Phase 1 | Phase 2 | Phase 3 | Phase 4 | Phase 5 | Phase 6 |
| $P_{mean}$ [MPa] | 9 | 11 | 8 | 5 | 2 | 2 |
| Mean sliding speed [m/s] | 0.37 | 0.012 | 0.064 | –0.0065 | –1 | –1.66 |
| Relative movement [μm] | 3.92 | 0.106 | 0.422 | 0.001 | 10.8 | 19.3 |
| Movement mode | Slip | Stick | Stick | Stick | Slip | Slip |
| Phase duration [μs] | 10.6 | 8.8 | 6.6 | 1.6 | 10.8 | 11.6 |
| Sliding distance for forward and return stroke of one wave [μm] | | 4.45 | | | 30.1 | |
| Mean sliding speed [m/s] | | 0.17 | | | –1.25 | |
| Heat loss for COF = 0.30 [W/mm²] | 0.11 | 0.039 | 0.15 | <0.01 | 0.6 | <1.2 |

Table 3 shows a division of a 50 μs 20 kHz cycle into several operating periods referred to as "phases". This division was made for a motor with a mechanical power of 5 kW.

The division of a cycle according to table 3 shows two contact modes for the movement of the micro-bumps on the material surface.

Firstly, contact can be made according to an elastic deflection of the bumps, referred to as "sticking" (according to the terminology generally used by those skilled in the art).

Secondly, contact can be made according to total "sliding" or "slipping" (according to the terminology generally used by those skilled in the art).

For movements of less than 0.42 μm, the micro-bumps stick and do not slide. They are resistant to fatigue, since they are subject to elastic stress. In this case of an elastic response of the micro-bumps, without sliding, or in sticking mode, the frictional energy is null. The slight losses are located at the small anelastic micro-bump deformation losses.

The feeder returns during the second phase of the cycle with heat densities of the order of 1 W/mm², while remaining below this value, at sliding speeds of the order of 1.7 m/s, while remaining below this value.

Under these conditions, the choice of materials is restricted to polymers that are resistant to high temperatures, certain steels, cemented materials and ceramics, with the same properties liable to be required for coatings. The material or coatings must have low wear rates for such stress.

In order to subject the micro-bumps to the correct stress, with interrupting contact, this behaviour being typical of "polished" surface conditions, the radius of curvature of the micro-bumps must be "large". Such a radius of curvature is obtained by machining.

At high sliding speeds (of the order of 1.66 m/s), the tribosystem performs "running-in". It has a surface condition with a particular working roughness. The radii of curvature of the bumps have values determined by the speed. In this way, machining makes it possible to obtain a predetermined topography by means of testing on motors.

Therefore, the above developments apply to the sticking contact mode combined with a sliding speed of the order of approximately 1.25 m/s.

The determination of the topographic values of the frictional surfaces after testing in a real motor represents the only method to reduce the initial wear rate. In this way, if the bumps are subject to elastic stress, the topography remains invariant over time.

Specific Case of High-Power Motor

The developments below apply advantageously to cases of high-power motors producing quantities of heat of 220,000 Joules during actuation of a 5 kW high-power motor.

All the characteristics required by friction materials are summarised in the developments below.

Tribological Properties

The materials or coatings must have a static and dynamic coefficient of friction between 0.2 and 0.8, in particular, they may preferentially have a value between 0.5 and 0.8.

In addition, they must have wear rate $k_v$ greater than $1.10^{-8}$ mm³/Nm for a quantity of heat Q equal to 220,000 Joules with 2000 years of accumulative service life.

In this way, these values are:

invariant with relative humidity;

invariant to temperature, up to 200° C.; and invariant to nominal contact pressures P of less than 12 MPa.

The COF and wear rate values must never be less than the minimum values as a function of the temperature, pressure and relative humidity.

In addition, the torques must not comprise adhesion wear mechanisms.

In addition, the static COFs are greater than the dynamic COFs.

Mechanical Properties

The materials or coatings must have a fatigue resistance, up to $1.4.10^{11}$ cycles for 2000 accumulative hours.

The materials or coatings must have a shearing resistance at the interface of the coating which has a value greater than 12 MPa.

Unfortunately, fatigue test results above $10^8$ alternations and at 20 kHz are rare or nonexistent.

Heat Properties

The first points discussed below characterise the case when the temperature of the feeder or rotor is to be limited.

Case of Feeder (Constant Mass)

It must have a mass heat capacity $Cp^{22C}$ greater than 0.35 [J/g/K] and preferentially greater than or equal to 0.5 [J/g/K].

Alternatively, preferentially, for a temperature rise of ΔT=150 K, it must have a mass heat capacity $Cp^{22C}$ greater than 52.5 [J/g]. These values are based on table 1.

It should be note that, in a relatively near future, progress in active materials, particularly piezoelectric materials will undoubtedly allow higher Curie temperatures.

Case of Rotor (Constant Volume)

If the rotor is devised to be able to accumulate a maximum quantity of heat, it must have a heat capacity greater than 2 [J/cm³/K], or 400 [J/cm³] for ΔT=200 K. Preferentially, it should be greater than or equal to 2.5 [J/cm³/K], or 500 [J/cm³] for ΔT=200 K.

The above conditions on feeders and rotors are alternating. They may also preferentially be cumulative, with the feeders, rotors verifying one of the above conditions respectively in this case.

However, if the rotor is devised to minimise its weight, the heat capacity/rotor weight ratio must be greater than 70 [J/g] for a temperature rise of ΔT=200 K.

The following point characterises the case when a maximum feeder heat accumulation capacity is required.

Diffusion Coefficient Ratios

The frictional heat dissipated in all the feeders must not exceed the heat capacity of the feeders $Q_{feeders}$ for ΔT=150 K in accordance with equation 2.

The last point characterises the case when the feeder temperature is to be minimised.

Heat Flow Distribution Ratio

The feeder temperature is minimised by maximising the heat flow distribution ratio to the rotor, said distribution complying with equation 1.

Corrosion Resistance

All the materials and coating layers must be resistant in the long term, or insensitive to corrosion and moisture. In addition, they can have passivation properties.

Since the motor is tight, water and road de-icing or antifreeze fluids such as calcium chloride, sodium chloride, monoglycols and urea are not considered.

EXAMPLE OF SPECIFIC EMBODIMENT

The possible friction materials include ceramics, cemented materials in monolithic forms or coatings deposited on steel, grey cast iron, aluminium alloy and titanium substrates.

The tribological properties and corrosion resistance of the range of materials given demonstrate that ceramic and cemented materials, or coatings consisting of said materials, meet the requirements of a high-power motor.

However, with the increase in heat losses to be dissipated during a maximum actuation of 220 kJ, and with an accumulative life of approximately 2000 hours, the functional behaviour primarily depends on the thermo-physical properties.

In this way, the important properties are particularly the ability to store heat losses, and the heat flow distribution between feeders and rotors, as a function of the diffusion coefficients of the frictional materials.

In this case, some materials cannot be used for the feeder, since they guide the heat flow to the feeder.

Mechanical safety aspects are important on the rotor side. The rupture strength values, particularly when hot, of the cemented materials and titanium alloys are points in favour of these materials.

The frictional surface distribution between the feeders and rotors is approximately 1:2.96. As a result, it is possible to envisage using the same materials and coatings for the rotors (second body) and feeders (first body).

The (hard) layers deposited by thermal projection must be machined to final roughness values of Ra (arithmetic roughness) less than 0.04 $\mu$m. This roughness makes it possible to eliminate an abrasive action and minimise "running-in" (according to the terminology generally used). Preferentially, since the coatings have a porosity between 1% by volume and 4% by volume, the roughness values $R_{pK}$ and $R_{vK}$ (defined according to the standard DIN EN ISO 13565-2:1998) must be less than 0.030 $\mu$m and 0.070 $\mu$m respectively. The thicknesses of the machined layers (functional thickness) deposited by thermal projection is greater than 50 $\mu$m, and preferentially greater than 200 $\mu$m.

TABLE 4

Materials for feeders and rotors

| Surfaces/Substrates | Thermal projection coatings |
|---|---|
| (Ti,Mo) (C,N) + 8–20% NiMo (grades TM 8, 10, 20) | Not coated |
| WC-6Ni | Not coated |
| MgO—ZrO$_2$ (feeder) | Not coated |
| HIP-AlN or GPS-AlN (feeder) | Not coated |
| Globular grey cast irons | And bainitic hardening and/or alloyed with Cr, Mo, Al, V, Ti | Magneli phases (Ti$_n$O$_{2n-1}$, 4 = n = 10, where n is an integer or mixtures such as 40% Ti$_4$O$_7$/60% Ti$_5$O$_9$) WC-17% Co (Ti$_1$Mo) (C$_1$N) or (Ti$_2$W) (C$_1$N) + Ni/Mo >75Cr$_3$C$_2$/<25NiCr 4-6Al$_2$O$_3$/6-4TiO$_2$ |
| Lamellar grey cast irons | | |
| Steels (Z6CND16-05-01) | | |
| X5CrNiCu15-5 steels | | |
| AlSI + SiC/Al$_2$O$_3$ alloys | | |
| AlSi + Al$_4$C$_3$/Al$_2$O$_3$/TiB$_2$ dispersoid alloys | | |
| Al—Fe—V alloys | | |
| T6 and greater 6xxx series and 7xxx series aluminiums | | |
| Titanium alloys, UNS R5xxxx, such as TiAl6V4. | | |

Table 4 shows the materials suitable for high-power motor applications.

In the above table, the presence of the material HIP (Hot Isostatic Pressed) aluminium nitride or HIP-AlN or GPS (Gas Pressure Sintered) aluminium nitride or GPS-AlN is noted.

The grey cast irons according to the present invention are hypoeutectic between 2.06% and <4.3% by weight of carbon, which contain up to 2.5% by weight of silicon to break down Fe$_3$C.

The alloyed cast irons can contain up to 0–5% chromium, and/or 0–6% vanadium, and/or 0–5% manganese, and/or 0–4% molybdenum, and/or 0.2% titanium and/or 0–5% aluminium, and/or 0–5% phosphorus.

The 7xxx series alloys contain, as the main alloy element, between 6% and 14% by weight of zinc and are heat-treated in the "T6" degradation level, or higher.

The AlSi alloys contain up to 30% by volume of dispersoids, whiskers or fibres consisting of SiC, Al$_2$O$_3$, Al$_4$C$_3$, TiB$_2$ or B$_4$C and mixtures thereof.

The Al—Fe—V alloys contain as main alloy elements up to 15% by weight of iron and up to 10% by weight of V.

Zirconia toughened alumina or ZTA and zirconia and platelet toughened alumina or ZPTA according to the terminology generally used by those skilled in the art are alumina matrix ceramics.

Case of ZTA.

In an alumina matrix, it is possible to incorporate, in an economical way, 15% by volume of zirconia stabilised with Y$_2$O$_3$ or CeO$_2$. The maximum possible diameter of the zirconia is less than 0.7 $\mu$m. Zirconia toughened alumina (ZTA) materials typically contained 11 vol.-% Y$_2$O$_3$—ZrO$_2$ in 89 vol.-% Al$_2$O$_3$.

Case of ZPTA.

With the addition of SrO (preferentially 0.8% by weight) into the Al$_2$O$_3$—ZrO$_2$(Y$_2$O$_3$) system, it is possible to produce SrAl$_{12}$O$_{19}$ precipitations. These whiskers are approximately 3 $\mu$m long and approximately 0.3 $\mu$m thick. The addition of whiskers increases the toughness K$_{IC}$ up to 16 MPavm.

To control the hardness loss caused by adding SrO, chromium oxide Cr$_2$O$_3$ forms a phase SrAl$_{12-x}$ Cr$_x$O$_{19}$ by diluting alumina in the crystal. A quantity of 0.3% by weight of the Cr$_2$O$_3$ already gives a considerable increase in hardness.

Titanium oxide showing a stoechiometric oxygen deficiency (planar defects). It is presented in several forms.

Ti$_n$O$_{2n-1}$, where 4=n=10, n is an integer and

Ti$_n$O$_{2n-1}$, where n is an integer 16=n=50.

These two materials are preferentially applied as a coating by thermal projection or are stuck to the monolithic feeder.

Case of Long-Term Operation

Cases of long-term operation refer to accumulative service lives of 2,000 hours with heats of 220,000 Joules.

In these cases, the number of materials and coatings that can be used is reduced, particularly due to high heat stress.

For example, carbon-carbon (CfC), titanium alloys and WC-6Ni have an insufficient heat accumulation capacity to store frictional losses (see tables 1, 2 and 7).

Table 5 shows examples of materials that can be used in the tribosystem with heats of 220,000 Joules and a service life of 2,000 hours.

TABLE 5

Materials for Rotors

| Supports/Substrates for Rotors | Thermal Spray Coatings |
|---|---|
| (Ti, Mo) (C, N) + 8–20% Ni/Mo (TM 8, 10, 20 grades) | Not Coated |
| Globular gray cast iron [austempering bainitic] | Magneli phases (Ti$_{nO2n-1}$, 4 ≤ n ≤ 10, with integer n or mixtures such as 40% Ti$_4$O$_7$/60% Ti$_5$O$_9$) WC-17% Co (Ti, Mo) (C, N) or (Ti, W) (C, N) + Ni/Mo 75 Cr$_3$C$_2$/<25 NiCr 4-6Al$_2$O$_3$/4-6TiO$_2$ |
| Lamellar gray cast iron [hardening] | |
| Steels (Z6CND16-05-01) | |
| Steels X5CrNiCu15-5 | |
| Alloys AlSi + SiC/Al$_2$O$_3$ Alloys | |
| AlSi + dispersoids: Al$_4$C$_3$/Al$_2$O$_3$/TiB$_2$ | |
| Alloys Al—Fe—V | |
| Aluminums Series 6xxx in T6 and higher and Series 7xxx | |

The coatings deposited on the hot top by thermal spray such as

WC-17% Co, (Ti, Mo) (C, N) or (Ti, Mo) (C, N)+Ni/Mo and >75 $Cr_3C_2$/<25 NiCr have a very good resistance to wear and have elevated thermal conductivity. The elevated thermal conductivity will increase or guide the frictional heat flow towards the hot top. This represents a risk for the hot top and the active ceramics, especially the piezoelectrics. Thus, these materials are preferably applied to the rotors.

Case of Lightering

For example, for a design providing for two Z6CND16-05-01 steel rotors, it will be recalled that the two rotors have a mass of approximately 1.94 kg.

The possibility of lightering are as follows

Firstly, a reduction of the absolute weight can be made.

The reduction of the absolute weight of the rotors can be achieved in the case of a low level of generated heat. In this strategy coated aluminum alloys are preferred, said alloys reducing the weight of the rotors to about 680 to 730 grams.

One could also attempt to achieve a maximization of the heat storage capacity. This latter possibility is summarized in Table 7.

Maximization of the mass heat storage capacity of the rotor favors the coated cast irons, Z6CND16-05-01 coated steel, coated SiSiC, uncoated TM 8, 10, 20 grades and the WC-6Ni grades course, fine or ultrafine grain, uncoated.

If weight optimization remains at any time an important subject in the case of the high level of generated heat, the use of coated gray casts (alloyed and/or austempered), the uncoated TMxx grades and Z6CND16-05-01 continue to be acceptable.

Table 6 shows the materials that can be utilized for friction applications in the hot top/rotor tribosystem for energy dissipated by the engine in operation with 220,000 Joules and a life span of 2,000 hours.

TABLE 6

Materials for Hot-tops

| Supports/substrates for hot tops | Thermal spray coating |
| --- | --- |
| Zirconia toughened alumina (ZTA, ZPTA) | Uncoated |
| ($Ti_nO_{2n-1}$, $4 \leq n \leq 10$, with integer n, or 40% $Ti_4O_7$/ 60% $Ti_5O_9$ type mixtures | Uncoated |
| AIN by hot sintering (HIP - AIN) | Uncoated |
| AIN by pressure sintering (GPS - AIN) | Uncoated |
| SiSiC (for certain low heat applications) | Uncoated |
| MgO—$ZrO_2$ | Uncoated |
| (Ti, Mo) (C, N) + 8–20% Ni/Mo (TM 8, 10, 20 grades) | Uncoated |
| X5CrNiCu15-5 Steels Globular gray austempering cast iron [bainitic Lamellar gray hardening] cast iron and/or alloyed by Cr, Mo, Al, V, Ti, P, Mn Steels (Z6CND16-05-01) SiSiC | Magneli phases ($Ti_nO_{2n-1}$, $4 \leq n \leq 10$, with integer n or mixtures such as 40% $Ti_4O_7$/60% $Ti_5O_9$) 4-6$Al_2O_3$/6-4$TiO_2$ WC-17% Co (Ti, Mo) (C, N) or (Ti, W) (C, N) + Ni/Mo 75 $Cr_3C_2$/<25 NiCr |

In Table 6, the materials above the heavy line are the monolithic materials.

The materials under the heavy line are the materials requiring a coating.

MgO— or $Y_2O_3$—$ZrO_2$ rotors and the $Ti_nO_{2n-1}$ rotors with n being an integer (that have a thermal conductivity of less than 4 W/mK) will primarily guide the thermal flow towards each rotor.

The break strength of $Ti_nO_{2n-1}$ is too low for it to be applied to rotors.

The SiSiC grades with 8–18% Si by weight and coated represent an optimum material for the rotor and for the hot top when they are coated using a low thermally conductive coating.

For certain low heat applications, SiSiC can be used for rotors and/or the hot tops without coating.

Table 7 shows a comparison of the calorific capacities and the weights of monolithic materials for 125.8 $cm^3$ rotors (diameter equal to 197 mm×5 mm) and for $\Delta T$=200 K.

TABLE 7

| Materials | Weight of 2 rotors [kg] | Calorific capacity of 2 rotors [kJ] | Calorific ratio/ weight [kJ/kg] |
| --- | --- | --- | --- |
| $C_{fiber}$–$C_{matrix}$ | 0.452 | 56.2 | 124 |
| TiAl6V4 | 1.156 | 120.1 | 103 |
| Aluminum 6xxx | 0.679 | 121.0 | 178 |
| AlN | 0.830 | 133.0 | 160 |
| AlSi + SiC/$Al_2O_3$ | 0.729 | 131.3 | 179 |
| $Si_3N_4$ | 0.805 | 128.9 | 160 |
| (Ti, Mo) (C, N) | 1.35 | 150.1 | 92 |
| Z6CND16-05-01 | 1.937 | 166.3 | 86 |
| SiSiC | 0.779 | 171.4 | 219 |
| WC-6Ni | 3.748 | 187.4 | 50 |
| FGL gray cast iron | 1.811 | 188.6 | 103 |
| MgO—$ZrO_2$ | 1.434 | 196.4 | 137 |
| FGS gray cast iron | 1.811 | 223.9 | 124 |
| $Ti_nO_{2n-1}$ | 1.313 | 221.1 | 168 |

It should be noted, however, that WC-6Ni is too heavy to constitute the material of the rotor that must be relatively light in the case of a high-performance motor.

What is claimed is:

1. A system, especially adapted for high-power motors comprising at least one rotor (1a; 1b) and means (4a, 4b; 5a, 5b) comprising active elements (7, 8) capable of rotating the rotor(s) (1a; 1b) by their synchronized deformation, said rotating means of the rotor(s) comprising at least one petal (6) comprising a hot top (11), characterized in that the material of each hot top (11) is such as that it has a mass thermal capacity ($Cp^{22C}$) of greater than 0.35 [J/g/K], and/or the material of each rotor (1a; 1b) is such that it has a thermal capacity of greater than 2 [J/$cm^3$/K].

2. The system according to claim 1, characterized in that each hot top (11) has a mass thermal mass capacity greater than 0.5 [J/g/K].

3. The system according to claim 1 or claim 2, characterized in that the thermal capacity of each rotor (1a; 1b) is greater than 2.5 [J/$cm^3$/K].

4. The system according to claim 1, characterized in that the material of each hot top (11) and each rotor (1a; 1b), this material being uncoated, comprised of:

(Ti, Mo) (C, N)+8–20% bonding Ni/Mo (TM 8, 10, 20 grades 0; and/or

WC-6Ni; and/or zirconium reinforced aluminum (ZTA, ZTPA); and or

AIN; and/or silicon carbide infiltrated with silicon SiSiC, with 8–20% by weight of silicon.

5. The system according to claim 1, characterized in that the material of each hot top (11) is comprised of:
- MgO—ZrO2, and/or
- aluminum reinforced with zirconia (ZTA, ZTPA), and/or
- hot sintered aluminum nitrate HIP-AIN, and/or
- pressure sintered aluminum nitrate GPS-AIN, and/or
- a Magneli phase ($Ti_nO_{2n-1}$, $4 \leq n \leq 10$ with n being an integer, or the 40% $Ti_4O_7$/60% $Ti_5O_9$ type mixtures).

6. The system according to claim 1, characterized in that the material of each hot top (11) and each rotor (1a; 1b) is coated by thermal spraying using a material comprising:
- Magneli phases ($Ti_nO_{2n-1}$, $4 \leq n \leq 10$ with n being an integer, or the 40% $Ti_4O_7$/60% $Ti_5O_9$ type mixtures);
- WC-17% Co; and/or
- (Ti, Mo) (C, N) or (Ti, W) (C, N)+bonding Ni/Mo; and/or
- >75 $Cr_3C_2$/<15 NiCr; and/or
- 4-6$Al_2O_3$/6-4 $TiO_2$.

7. The system according to claim 6, characterized in that the material of each hot top (11) comprises:
- globular gray cast iron and/or lamellar gray cast iron and/or with an austempering and/or alloyed with Cr, Mo, Al, V, Ti; and or
- Steels (z6CND16-05-01); and/or
- X5CrNiCu15-5 steels; and/or
- AlSi+SiC/$Al_2SO_3$; and/or
- AlSi+dispersoids $Al_4C_3$/$Al_2O_3$/$TiB_2$ alloys; and or
- Al—Fe—V alloys; and/or
- Series 6xxx aluminum in T6 and greater and 7xxx series; and/or
- silicon carbide infiltrated with silicon SiSiC; and/or
- Titanium alloys, UNS R5xxxx, such as TiAl6V4.

8. The system according to claim 6, characterized in that the hard layers deposited by thermal spraying must be machined to the final roughness of $R_a$ (arithmetic roughness) of less than 0.04 $\mu$m, the thickness of the machined layers being greater than 50 $\mu$m.

9. The system according to claim 6, characterized in that the values of roughness $R_{pK}$ and $R_{vK}$ of the DIN NUMERIC ENTRY WORD ISO 13565-2:1998 norm are less than 0.030 $\mu$m and 0.070 $\mu$m, respectively.

* * * * *